(12) United States Patent
Cavelius et al.

(10) Patent No.: US 11,261,026 B2
(45) Date of Patent: Mar. 1, 2022

(54) CONTAINER STACKING STORAGE SYSTEM LOADING TROLLEY HAVING FIRST AND SECOND LIFT DRIVES

(71) Applicant: Jungheinrich Aktiengesellschaft, Hamburg (DE)

(72) Inventors: Jörg Cavelius, Bad Vilbel (DE); Michael Becker, Hainburg (DE); Timm Morawietz, Tholey-Überroth (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 16/998,659

(22) Filed: Aug. 20, 2020

(65) Prior Publication Data

US 2021/0053760 A1 Feb. 25, 2021

(30) Foreign Application Priority Data

Aug. 23, 2019 (EP) .................................... 19193376

(51) Int. Cl.
*B65G 1/137* (2006.01)
*B65G 57/02* (2006.01)

(52) U.S. Cl.
CPC ............ *B65G 1/1375* (2013.01); *B65G 57/02* (2013.01)

(58) Field of Classification Search
CPC ................ B65G 1/0471; B65G 59/063; B65G 2814/0304; B65G 57/30; B65G 59/06; B66F 7/0633; B66F 7/10; B66F 7/02; B66F 7/12; B23Q 7/1436; B23Q 7/1442
See application file for complete search history.

(56) References Cited

U.S. PATENT DOCUMENTS

| | | | | |
|---|---|---|---|---|
| 4,352,617 A | * | 10/1982 | Sakai ................... | B65G 57/303 414/790.1 |
| 4,684,308 A | * | 8/1987 | Dorner ................ | B65G 57/302 414/795.3 |
| 5,156,514 A | | 10/1992 | Zäh | |

(Continued)

FOREIGN PATENT DOCUMENTS

| | | |
|---|---|---|
| CN | 1886313 A | 12/2006 |
| CN | 104169196 A | 11/2014 |

(Continued)

OTHER PUBLICATIONS

English Translation, WO2010097425A1 (Year: 2010).*

(Continued)

*Primary Examiner* — Gregory W Adams
(74) *Attorney, Agent, or Firm* — Greenblum & Bernstein, P.L.C.

(57) ABSTRACT

A container stacking storage system loading trolley that includes a chassis and a container seat that is height-adjustable relative to the chassis. The container seat includes a receiving region with a container contact surface. A lifting device, operable in a lifting direction, is arranged between the chassis and the container seat, and includes a first lifting drive and a second lifting drive. The second lifting drive is configured to act on an unlocking device that is configured to act on holding elements of a container stacking storage system.

25 Claims, 3 Drawing Sheets

(56) References Cited

U.S. PATENT DOCUMENTS

| | | | | |
|---|---|---|---|---|
| 5,775,000 | A * | 7/1998 | Maekawa | H01L 21/68728 134/902 |
| 6,364,330 | B1 * | 4/2002 | Weber | B62B 1/10 108/136 |
| 8,500,101 | B2 * | 8/2013 | Yaoi | B66F 13/005 254/372 |
| 10,289,117 | B1 | 5/2019 | Zou et al. | |
| 2009/0297324 | A1 * | 12/2009 | Jaeger | B65G 59/063 414/795.7 |
| 2014/0308107 | A1 * | 10/2014 | Nickles | B65G 59/063 414/794.9 |
| 2015/0166313 | A1 * | 6/2015 | Knapp | B66F 7/10 254/89 R |
| 2016/0060037 | A1 * | 3/2016 | Razumov | B65G 1/1378 700/216 |
| 2017/0233199 | A1 * | 8/2017 | King | B65G 57/303 414/789.7 |
| 2017/0313513 | A1 * | 11/2017 | Cifelli | B65G 1/04 |
| 2018/0216703 | A1 * | 8/2018 | Etori | F16G 13/20 |

FOREIGN PATENT DOCUMENTS

| | | | |
|---|---|---|---|
| CN | 107667061 A | 2/2018 | |
| CN | 109292342 A | 2/2019 | |
| CN | 109516227 A | 3/2019 | |
| DE | 19849391 | 5/2000 | |
| DE | 102015000968 | 4/2016 | |
| EP | 0458021 | 11/1991 | |
| EP | 2404847 | 1/2012 | |
| WO | WO-2010097425 A1 * | 9/2010 | ........... B65G 59/063 |

OTHER PUBLICATIONS

Europe Search Report/Office Action conducted in counterpart Europe Appln. No. 19193376(dated Feb. 12, 2020).

China Office Action/Search Report conducted in counterpart China Appln. No. 202010612908.3 (dated Nov. 9, 2021) (w/ translation of Search Report).

* cited by examiner

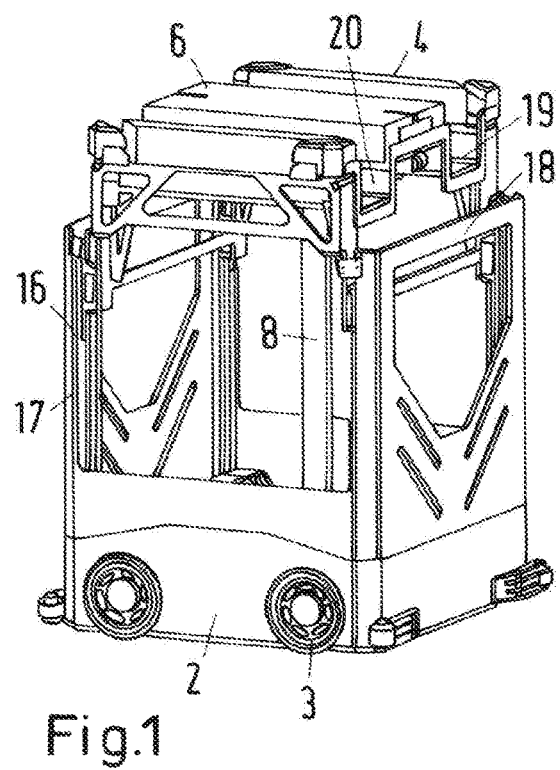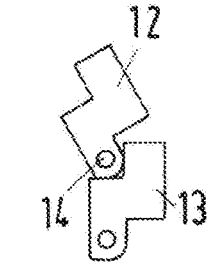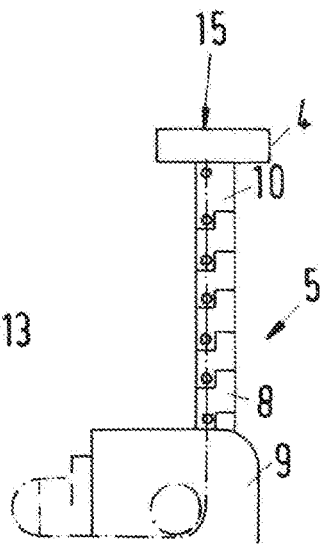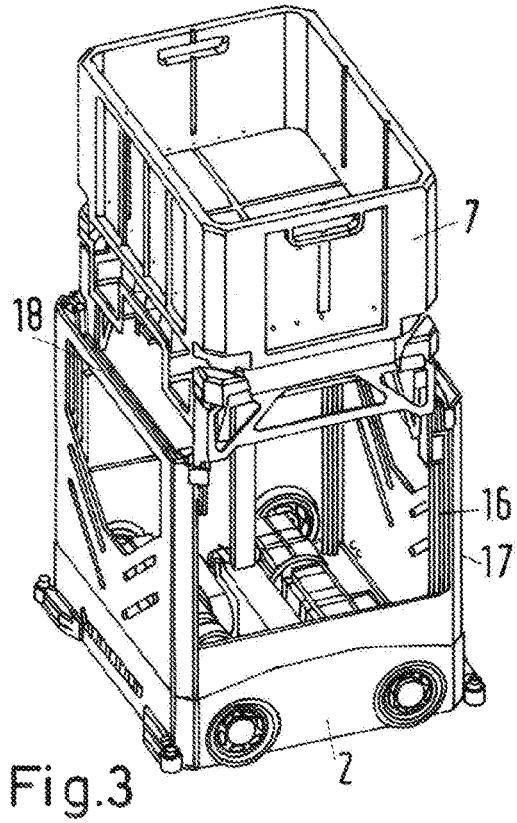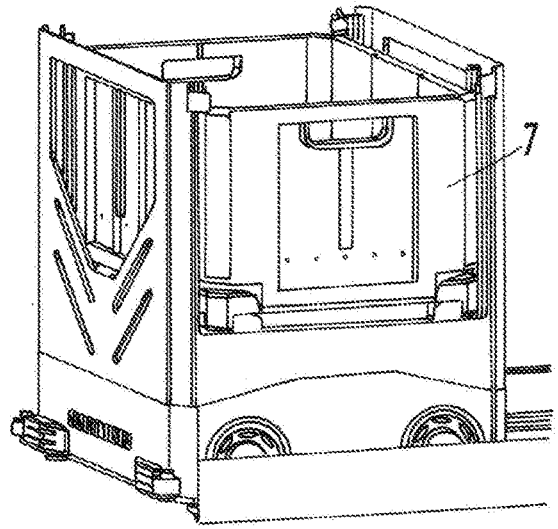

CONTAINER STACKING STORAGE SYSTEM LOADING TROLLEY HAVING FIRST AND SECOND LIFT DRIVES The present application claims priority under 35 U.S.C. § 119 of European Patent Application No. EP 19 193 376.1, filed Aug. 23, 2019, the disclosure of which is expressly incorporated by reference herein in its entirety.

BACKGROUND OF THE INVENTION

1. Field of the Invention

The present invention relates to a container stacking storage system loading trolley having a chassis and a container seat that is height-adjustable relative to the chassis, which container seat comprises a receiving region with a container contact surface, wherein a lifting device that operates in a lifting direction is arranged between the chassis and the container seat.

2. Discussion of Background Information

A loading trolley of this type is known from DE 198 49 391 C2, for example. It is used to introduce containers into a container stacking storage system or to remove containers from the container stacking storage system. In a container stacking storage system, there is at least one, but normally multiple, stacks of containers which are arranged at a certain distance above a floor or another contact surface. This is achieved in that the bottommost container of a stack is held by a releasable holding mechanism. To introduce a container, the loading trolley is driven under the stack. It then lifts the container until it contacts the, up to this point, bottommost container of the stack. In a further lifting of the container, the entire stack is lifted. The lifting takes place until the container being newly introduced has been guided past the aforementioned holding mechanism and, in a subsequent downward movement, is held at the bottom by the holding mechanism. If the container is to be removed from the stack, the entire stack must then be lifted slightly so that the holding mechanism can be released. The stack is subsequently lowered, and the holding mechanism then engages on the container that was second from the bottom up to this point, in order to hold this container. Once the container that was second from the bottom up to this point is hindered from a further downward movement by the holding mechanism, the container being removed can be further lowered. The loading trolley can then transport the container out of the container stacking storage system.

SUMMARY OF THE INVENTION

Embodiments of the invention are directed to a cost-efficient design for placement of containers into storage and to removal of containers from storage out of a container stacking storage system.

According to embodiments, a container stacking storage system loading trolley of the type named at the outset includes a lifting device including a first lifting drive and a second lifting drive, which acts on an unlocking device for holding elements of a container stacking storage system.

As described above, the containers of a stack are held at a distance from the floor in that an arrangement of holding elements engages with the bottommost container of a stack and hinders this container from moving further downward. If a container is placed into the stack from below and the container is moved upward, then the holding elements can be opened by the newly fed container. If the stack is subsequently moved downward, then the holding elements engage with the container newly placed into storage. In a removal of a container from a stack, however, the holding elements must be released and kept open until this container has been guided past the holding elements. For this purpose, the unlocking device is provided which can be actuated by the second lifting drive.

Preferably, the unlocking device is arranged on the container seat. It can thus be ensured that the unlocking device is moved towards the container stack together with the container seat when the container seat is lifted. Only a small additional movement is then necessary in order to unlock or release the holding elements or to keep the holding elements in an open position. In this state, however, it is at the same time ensured that the container seat adequately supports the bottommost container of the stack.

Preferably, the unlocking device comprises an unlocking element arrangement that can be moved in the lifting direction relative to the container seat. If the container seat has been moved far enough that the bottommost container of a stack is lifted slightly, then the keeping-open or unlocking of the holding elements can be effected by the further lifting movement of the unlocking element arrangement. The time necessary therefor can thus be kept extremely short. There results a virtually automatic coordination of movement sequences in the loading trolley.

Preferably, the unlocking element arrangement comprises multiple unlocking elements arranged in the region of corners of the container seat, wherein at least some of the unlocking elements comprise a centering surface arrangement that is directed towards the receiving region. The unlocking elements thus form a centering device with which the removed container can be guided with high precision into a desired position on the container seat when the container seat is moved up to the corresponding container from below. This is a significant advantage not only for the removal of a container from a stack; the desired position can also be ensured by the unlocking elements during the placement of a container into storage in the stack, as a result of which it can at the same time be ensured that the container being newly placed into storage is aligned with the container stack.

Here, it is preferred that the container seat is mounted in a floating manner relative to the chassis. It can then be moved, for example, a few millimeters in all directions in order to produce a consistency between the position of the container seat and the position of the container.

In this case, it is preferred that the unlocking element arrangement protrudes past the container contact surface in the receiving region in a transport position of the container seat. The unlocking element arrangement then not only forms a centering device with which the container is moved into a desired position on the container seat; it also forms a transport securing means, since the unlocking elements can respectively grip around the container over a small height region during a trip of the loading trolley, and can thus prevent the container from laterally sliding off of the container seat. Strong positive and negative accelerations can thus be realized with the loading trolley, so that the removal of containers from the stacking storage system and the placement of containers into storage in the stacking storage system can be carried out in a short amount of time.

Preferably, a sensor arrangement is provided with which a state in an operating region of the unlocking device can be monitored. The sensor arrangement can, for example, determine whether the unlocking device has properly unlocked the holding elements, or whether, during a lowering of a stack for the removal of a container, the holding elements have engaged with the then bottom container. Should this not be the case, for example, then the further lowering of the container seat can be stopped and an error message can be triggered. If necessary, it can also be provided that, through repeated lifting and lowering, an attempt to achieve a proper engagement of the holding elements with the container is made and an error message is not generated unless a satisfactory result is not obtained after several repetitions. Damage to a container stack, or even to the container stacking storage system, can thus be avoided.

Here, it is preferred that the sensor arrangement is arranged outside of the unlocking device. The sensor arrangement is then not blocked by the unlocking device.

Preferably, the loading trolley comprises a position sensor with which a position of the loading trolley can be determined. When the loading trolley is driven into the stacking storage system in order to place a container into storage or to remove a container, it must be possible to position the loading trolley in a relatively precise manner. The position sensor is very helpful for this purpose.

In this case, it is preferred that the sensor arrangement forms at least a part of the position sensor. If the sensor arrangement is able to determine the state in the region of the unlocking device, then the loading trolley is in the correct position.

Preferably, the lifting device comprises a traction chain. A traction chain is a chain having multiple chain links that are connected to one another in an articulated manner. However, the links have a shape that is embodied such that the links can bear against one another in a specific direction so that the chain attains a sufficient rigidity in this direction. The traction chain can be driven using a conventional rotary motor, for example an electric motor, wherein the lifting speed can be adjusted using the rotational speed of the motor.

Preferably, the traction chain comprises a first strand, which is arranged between the chassis and the container seat, and a second strand, which is directed transversely to the first strand. Thus, in the lowered state of the container seat, only a very small assembly space is required for the lifting device. The loading trolley can therefore be embodied with a correspondingly low height, which in turn results in the ability to minimize the clearance that must be available beneath the container stack(s). Accordingly, more space is available for placing the containers into storage.

In a preferred embodiment, the container seat can be moved over a lifting path and is guided on the chassis over the lifting path. The lateral stability, that is, a stability transverse to the lifting direction, is then ensured via the guidance on the chassis. The traction chain itself no longer needs to absorb any lateral forces. Here, it is sufficient if it can apply the forces necessary for lifting the container seat with the container or with the container stack.

Preferably, the container seat comprises in the container contact surface at least two notches that open to at least one side of the container contact surface. This can be utilized not only to transport the container out of the container stacking storage system, that is, beneath the container stacks, using the loading trolley; the loading trolley can also be used to then place the container in a position without the need for a further lifting device outside of the loading trolley. The placement device for the container then comprises, for example, two prongs that engage in the notch. On the top side of the prongs, rollers or transport belts can be arranged in order to laterally transport the container off of the loading trolley.

Embodiments are directed to a container stacking storage system loading trolley that include a chassis and a container seat that is height-adjustable relative to the chassis. The container seat includes a receiving region with a container contact surface. A lifting device, operable in a lifting direction, is arranged between the chassis and the container seat, and includes a first lifting drive and a second lifting drive. The second lifting drive is configured to act on an unlocking device that is configured to act on holding elements of a container stacking storage system.

Embodiments are directed to a method of moving a container on the loading trolley as described above. The method includes lifting the container seat, on which the container is supported on the container contact surface, relative to the loading trolley chassis; and lifting the container relative to the container seat to a position above the container contact surface.

In accordance with still yet other embodiments, when lifting the container relative to the container seat, a holding element of a container stacking storage system can be unlocked. Further, the method can include sensing a position of the holding element to determine whether the holding element is locked or unlocked. Still further, when the holding element is unlocked, the method can further include lowering the container to pass the unlocked holding element, and/or when the holding element is unlocked, the method further can include lowering unlocking elements of the loading trolley to locate the holding elements to a locking position.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a loading trolley for a container stacking storage system in a perspective illustration;

FIGS. 2A and 2B show operation of a traction chain;

FIG. 3 shows the loading trolley according to FIG. 1 with a container in an extended position;

FIG. 4 shows the loading trolley according to FIG. 1 with the container in a lowered position;

DETAILED DESCRIPTION OF THE PRESENT INVENTION

Figure 5:
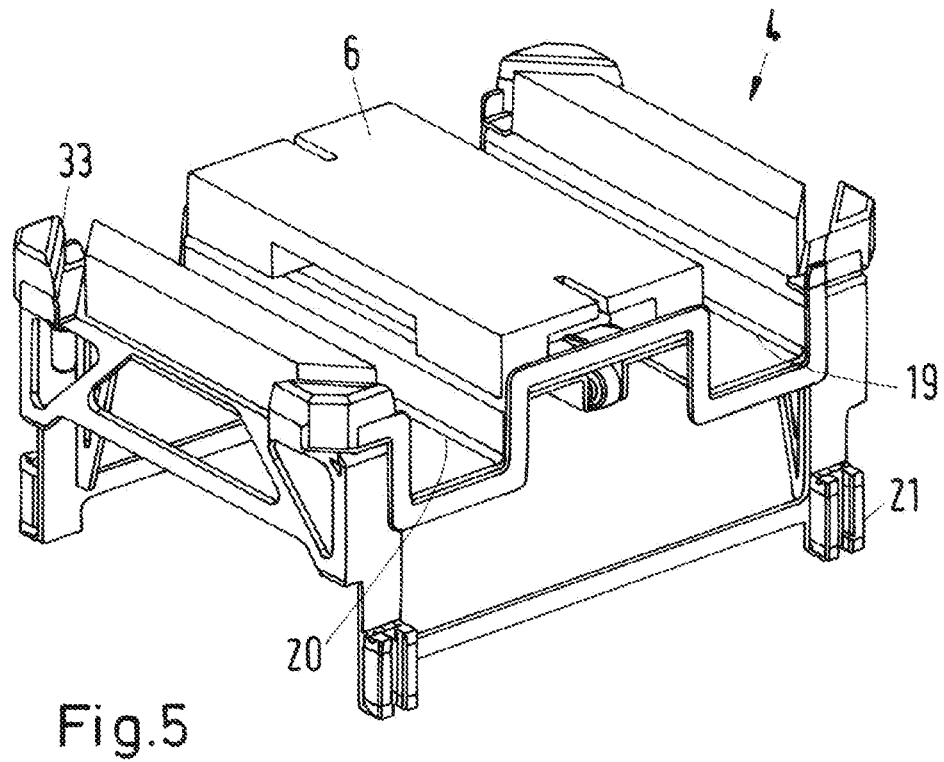
FIG. 5 shows a container seat of the loading trolley according to FIG. 5 with an unlocking device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a loading trolley (or vehicle) 1 for a container stacking storage system that is not illustrated in greater detail.

The loading trolley 1 comprises a chassis 2 having multiple wheels 3 with which the loading trolley can be moved on a flooring or other surface.

The loading trolley 1 furthermore comprises a height-adjustable container seat 4, the height of which can be changed relative to the chassis 2 by a lifting device 5 that is illustrated in greater detail in FIGS. 2A and 2B. With the lifting device 5, the container seat 4 can be moved in a lifting direction. The lifting direction thereby normally corresponds to parallel to the direction of gravity.

The container seat 4 comprises a container contact surface 6 on which a container 7 illustrated in FIGS. 3 and 4 can be placed. This will be explained further on below.

The lifting device 5 comprises a traction chain 8. The traction chain 8 is driven by an electric motor or other actuator that can be hydraulically or pneumatically embodied, which motor or actuator thus constitutes a lifting drive 9. The traction chain 8 comprises a first strand 10, which is arranged between the chassis 2 and the container seat 4 and extends in the lifting direction, and a second strand 11, which is directed transversely to the first strand. The second strand 11 runs preferably parallel to the floor (or other contact surface) on which the wheels 3 can roll. However, the direction of the second strand 11 does not need to coincide with the rolling direction of the wheels. As can be seen in FIG. 1, the direction of the second strand 11 is aligned perpendicularly to the rolling direction of the wheels 3. The second strand can also be aligned parallel to the rolling direction of the wheels.

The traction chain 8 comprises multiple chain links 12, 13 that can be connected to one another in an articulated manner at articulation points 14. Accordingly, the chain link 12 can (in reference to the illustration in FIG. 2B) be pivoted to the left relative to the chain link 13. If, on the other hand, the chain link 12 is pivoted to the right relative to the chain link 13, then the two chain links 12, 13 bear against one another in the lifting direction and can transmit a force, which has been symbolized by an arrow 15, to the container seat 4. If the container seat 4 is to be lowered, then the first strand 10 is lowered and the chain links 12, 13 can be pivoted relative to one another about the articulation point 14 so that the second strand 11 can extend preferably parallel to the floor.

However, the traction chain 8 needs to absorb only forces in the lifting direction. The container seat 4 is guided on the chassis 2 in a guide 16, and is thus supported in all directions transverse to the lifting direction. For this purpose, multiple pillars 17 are provided on the chassis 2, which pillars 17 can be connected to one another by connectors 18 if necessary. The corresponding guides 16 are arranged in the region of the pillars 17. With a sufficient rigidity, even one pillar 17 is sufficient, which then also forms only one guide 16. Instead of the traction chain 8, it is also possible to use a hydraulic or pneumatic cylinder, a scissor table or a cable pull.

As can be seen without difficulty from a comparison of FIGS. 3 and 4, the container seat 4 is guided on the chassis 2 over the entire lifting path, namely by the guides 16 in the region of the pillars or posts 17.

The container seat 4 comprises in the container contact surface 6 two or more notches 19, 20 that open to at least one side of the container contact surface 6. Preferably, however, the notches 19, 20 open towards both sides of the container contact surface 6. The opening of the notches is thereby preferably directed in the rolling direction of the wheels 3. It is thus possible to transfer a container 7 that is resting on the container contact surface 6 to a delivery station, wherein it is merely necessary that the delivery station comprise two prong-like projections that can enter into the notches 19, 20 when the loading trolley 1 is moved to this location accordingly. The container seat 4 can then be lowered so that the container 7 can be transferred to the delivery station. The receipt of a container 7 from a corresponding receiving device can also be realized in this manner. For this purpose, the loading trolley 1 is driven into the receiving device without a container 7. If the lifting device 5 then lifts the container seat 4, the container 7 comes free of the receiving device and can then be transported away together with the loading trolley 1.

FIG. 5 shows the container seat 4 in an enlarged illustration. Identical elements are provided with the same reference numerals in all figures.

On the container seat 4, guide elements 21 are arranged which are engaged with the guides 16 described above, in order to enable guidance of the container seat 4 over the entire lifting path. If only one guide 16 is provided, preferably only one guide element is also provided.

Figure 6:
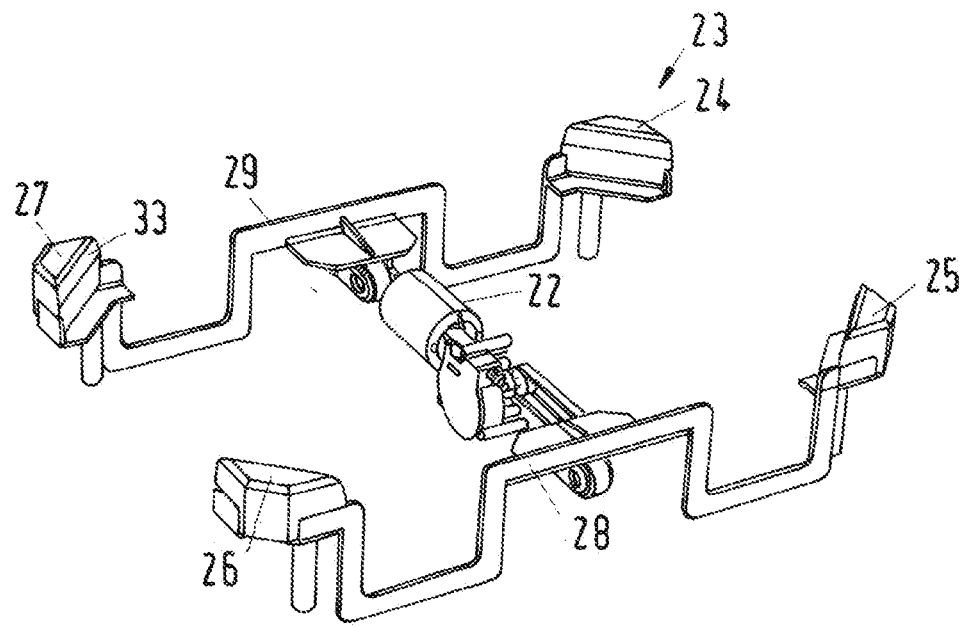
FIG. 6 shows the unlocking device.

In addition to the first lifting drive 9, which is formed by the motor of the lifting device 5, a second lifting drive 22 is provided which is illustrated in greater detail in FIG. 6. With the second lifting drive 22, an unlocking device 23 for holding elements of a container stacking storage system can be moved in the lifting direction. The second lifting drive 22 can be in form of a motor, in form of a hydraulic or pneumatic cylinder or in another way.

The unlocking device 23 comprises an unlocking element arrangement with four unlocking elements 24-27 which are arranged at four corners of the container contact surface 6. The unlocking elements 24-27 are respectively connected to one another in pairs by frames 28, 29. The second lifting drive 22 acts on the frames 28, 29. The second lifting drive 22 is arranged on the bottom side of the container seat 4. Accordingly, the unlocking device 23 is moved together with the container seat 4 when the container seat 4 is moved. However, it is additionally possible to move the unlocking device 23 further than the container contact surface 6 in the lifting direction. This is explained with the aid of FIGS. 7 and 8.

Figure 7:
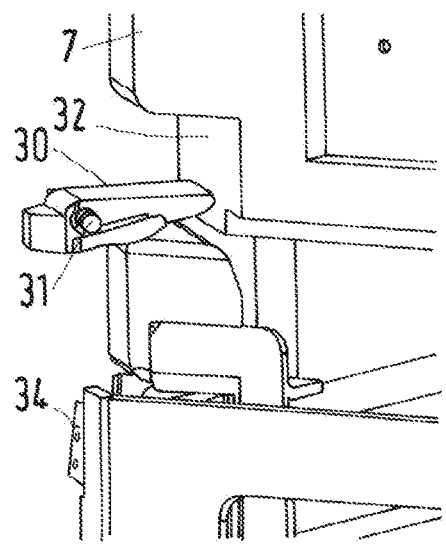
FIG. 7 shows a schematic illustration for the purpose of explaining the function of the unlocking device.

FIG. 7 shows a container 7 during placement into storage in a container stacking storage system that is not illustrated in greater detail. Only a holding element 30 of the container stacking storage system is illustrated. For each stack of containers 7, four such holding elements 30 are preferably provided which are arranged at the four corners of the stack. In principle, two holding elements 30 that are arranged in an opposing manner, preferably diagonally opposing at the corners of the container 7, are also sufficient.

The holding element 30 is embodied as a latch that is arranged such that it can be pivoted about an axis 31. When a container 7 is moved upwards from below, then the holding element 30 is pivoted upward about the axis 31 and allows the container, which comprises a recess 32 at the bottom end thereof, to pass. As soon as the recess 32 comes into the region of the holding element 30, the holding element 30 folds into the position illustrated in FIG. 7. When the container 7 is then lowered, it lies on the holding element 30. The container seat 4 can then be further lowered, and the loading trolley 1 is once again free for other tasks.

If, on the other hand, the bottommost container 7 is to be removed from the stack, then the unlocking device 23 comes into operation.

First, the container seat 4 is lifted far enough that the bottommost container 7 of a stack is resting on the container contact surface 6. The container seat 4 is then lifted further over a short distance. This short distance is sized such that the holding element 30 can be pivoted into the open position illustrated in FIG. 8.

For each holding element 30, this pivoting is effected by an unlocking element 26 (the other unlocking elements 24, 25, 27 are not illustrated here) in that the unlocking device 23 is moved further than the container seat 4 in the lifting direction until the unlocking element 26 enters into the recess 32. The container seat 4 can then be lowered with the extended unlocking device 23. The holding element 30 cannot fold back into the recess 32 since the recess 32 is blocked by the unlocking elements 24-27.

Figure 9:
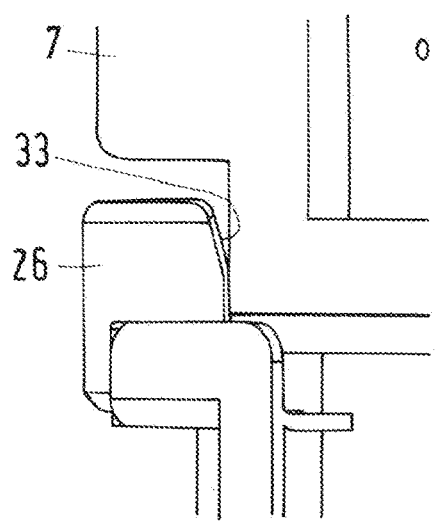
FIG. 9 shows a schematic illustration for the purpose of explaining centering surfaces.

As can be seen in particular in FIGS. 5, 6, and 9, the unlocking elements 24-27 also have a centering function. For this purpose, each of the unlocking elements 24-27 comprises a centering surface 33 that is tilted slightly relative to the lifting direction. If the container 7 is not precisely aligned relative to a desired position on the container contact surface 6, then this alignment occurs through the centering surfaces 33 that are directed towards the receiving region of the container seat 4. The receiving region is bounded at the bottom by the container contact surface 6.

It is then possible to ensure that the unlocking device 23 remains in an extended position, that is, protrudes past the container contact surface 6, when a container is resting on the container seat. This is then beneficial, for example, if the loading trolley 1 is to transport the container 7. The unlocking elements 24-27 then hold the container 7 in place on the container contact surface 6 and prevent the container 7 from shifting on the container contact surface 6. Thus, not only is a falling-off from the container contact surface 6 by the container 7 prevented; it can also be ensured that the container 7 always remains in a predetermined position on the container contact surface 6, which facilitates the further handling of the container 7.

Figure 8:
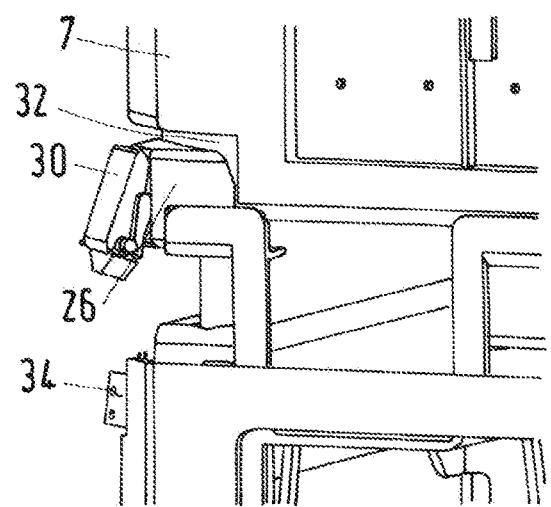
FIG. 8 shows the illustration according to FIG. 7 in a different position of the container.

As can be seen in FIGS. 7 and 8, a sensor arrangement 34 is arranged on the container trolley 1, with which sensor arrangement 34 a state in an operating region of the unlocking device 23 can be monitored. In particular, the sensor arrangement is provided for the purpose of determining whether the holding elements 30 have been lowered into a holding position during the lowering of a stack of containers 7. In this position, they have then engaged with the second-to-last container, that is, with the bottommost container not being removed. Should this not be the case, the further actuation of the lifting device, that is, the further lowering of the stack, can be interrupted and an error message can be outputted.

The sensor arrangement 34 is preferably arranged outside of the unlocking device 23, that is, it is not blocked by the unlocking device.

The sensor arrangement 34 can also be used to verify whether the loading trolley has reached the correct position within the stacking storage system. If the sensor arrangement 34 is able to determine that all holding elements 30 are located in the locking position, then the loading trolley 1 has arrived in the correct position.

However, it is also possible to use a separate position sensor (not illustrated in greater detail) that, for example, detects a center point or another distinct point on the bottom container of a stack, or a point or region in the container stacking storage system.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A container stacking storage system loading trolley comprising:
   a chassis;
   a container seat that is height-adjustable relative to the chassis, the container seat comprising a receiving region with a container contact surface,
   a lifting device, operable in a lifting direction, being arranged between the chassis and the container seat, the lifting device comprising a first lifting drive and a second lifting drive;
   the second lifting drive being configured to act on an unlocking device that is configured to act on holding elements of a container stacking storage system.

2. The loading trolley according to claim 1, wherein the unlocking device is arranged on the container seat.

3. The loading trolley according to claim 1, wherein the unlocking device comprises an unlocking element arrangement movable in the lifting direction relative to the container seat.

4. The loading trolley according to claim 3, wherein the unlocking element arrangement comprises multiple unlocking elements arranged in a region of corners of the container seat, and wherein at least some of the unlocking elements comprise a centering surface arrangement that is directed towards the receiving region.

5. The loading trolley according to claim 1, wherein the container seat is mounted in a floating manner relative to the chassis.

6. The loading trolley according to claim 3, wherein the unlocking element arrangement protrudes past the container contact surface in the receiving region in a transport position of the container seat.

7. The loading trolley according to claim 1, further comprising a sensor arrangement configured to monitor a state of an operating region of the unlocking device.

8. The loading trolley according to claim 7, wherein the sensor arrangement is arranged outside of the unlocking device.

9. The loading trolley according to claim 1, further comprising a position sensor configured to determine a position of the loading trolley.

10. The loading trolley according to claim 9, further comprising a sensor arrangement configured to monitor a state of an operating region of the unlocking device, the sensor arrangement forming at least a part of the position sensor.

11. The loading trolley according to claim 1, wherein the lifting device comprises a traction chain.

12. The loading trolley according to claim 11, wherein the traction chain comprises a first strand, which is arranged between the chassis and the container seat, and a second strand, which is directed transversely to the first strand.

13. The loading trolley according to claim 1, wherein the container seat is movable over a lifting path and is guidable on the chassis over the lifting path.

14. The loading trolley according to claim 1, wherein the container seat comprises in the container contact surface at least two notches that open to at least one side of the container contact surface.

15. The loading trolley according to claim 1, wherein the first lifting drive is arranged to adjust a height of the container seat relative to the chassis.

16. The loading trolley according to claim 1, wherein the first lifting drive comprises a motor and the second lifting device comprises a hydraulic or pneumatic cylinder.

17. The loading trolley according to claim 1, wherein the holding elements comprise levers pivotably connected to the container storage stacking system,
wherein the unlocking device comprises polygonal pieces connected to at least one frame, the polygonal pieces being arranged at corners of the container seat to be liftable and lowerable relative to the container seat, and
wherein the polygonal pieces have contact surfaces that engage the levers of the holding elements of the container storage stacking system, to pivotably displace the levers to stack a container in or remove a container from the container storage stacking system.

18. The method according to claim 1, wherein the second lifting drive is arranged on a bottom side of the container seat.

19. A method of moving a container on the loading trolley according to claim 1, the method comprising:
lifting the container seat, on which the container is supported on the container contact surface, relative to the loading trolley chassis; and
lifting the container relative to the container seat to a position above the container contact surface.

20. The method according to claim 19, wherein, when lifting the container relative to the container seat, a holding element of a container stacking storage system is unlocked.

21. The method according to claim 20, further comprising sensing a position of the holding element to determine whether the holding element is locked or unlocked.

22. The method according to claim 20, wherein, when the holding element is unlocked, the method further comprises lowering the container to pass the unlocked holding element.

23. The method according to claim 20, wherein, when the holding element is unlocked, the method further comprises lowering unlocking elements of the loading trolley to locate the holding elements to a locking position.

24. The method according to claim 20, wherein, the holding element of the container storage stacking system comprises a lever pivotably connected to the container storage stacking system.

25. A container stacking storage system loading trolley comprising:
a chassis;
a container seat that is height-adjustable relative to the chassis, the container seat comprising a receiving region with a container contact surface,
a lifting device, operable in a lifting direction, being arranged between the chassis and the container seat, the lifting device comprising a first lifting device comprising a motor and a second lifting drive comprising a hydraulic or pneumatic cylinder;
the second lifting drive being configured to act on a polygonal piece that is configured to act on levers of a container stacking storage system.

\* \* \* \* \*